United States Patent [19]

Saccomano et al.

[11] 4,261,034

[45] Apr. 7, 1981

[54] REMOTE DISTRIBUTED INTERRUPT CONTROL FOR COMPUTER PERIPHERALS

[75] Inventors: Michael L. Saccomano, Irvine; Jerry R. Washburn, Mission Viejo; Donald W. Goodrich, Irvine; Victor A. Wagner, Mission Viejo; Phillip A. Kaufman, Saratoga, all of Calif.

[73] Assignee: Computer Automation, Inc., Irvine, Calif.

[21] Appl. No.: 54,243

[22] Filed: Jul. 2, 1979

Related U.S. Application Data

[63] Continuation of Ser. No. 866,159, Dec. 30, 1977.

[51] Int. Cl.³ .............................................. G06F 9/18
[52] U.S. Cl. ................................................ 364/200
[58] Field of Search ... 364/200 MS File, 900 MS File

*Primary Examiner*—Gareth D. Shaw
*Assistant Examiner*—C. T. Bartz
*Attorney, Agent, or Firm*—Knobbe, Martens, Olson, Hubbard & Bear

[57] ABSTRACT

A special broadcast communication link is provided between a central processing unit and plural computer peripheral devices, the communication link being in addition to normal data and addressing communication lines, and providing a distributed control channel which is used to inhibit selected classes of interrupt signals from controllers associated with the peripheral devices in accordance with an interrupt classification system. This communication channel permits the central processing unit to issue a data command which selectively inhibits the peripheral devices from issuing selected classes of interrupt signals.

18 Claims, 4 Drawing Figures

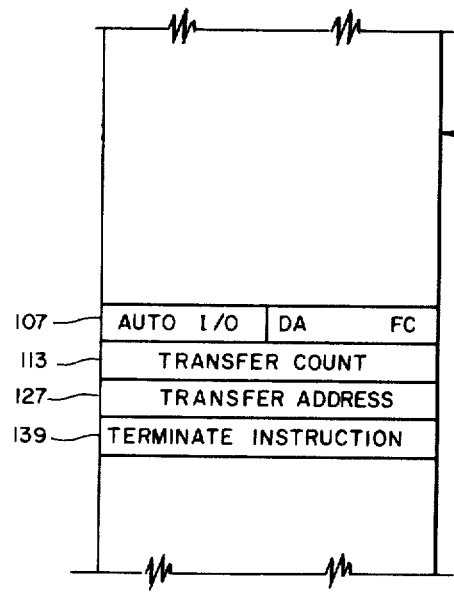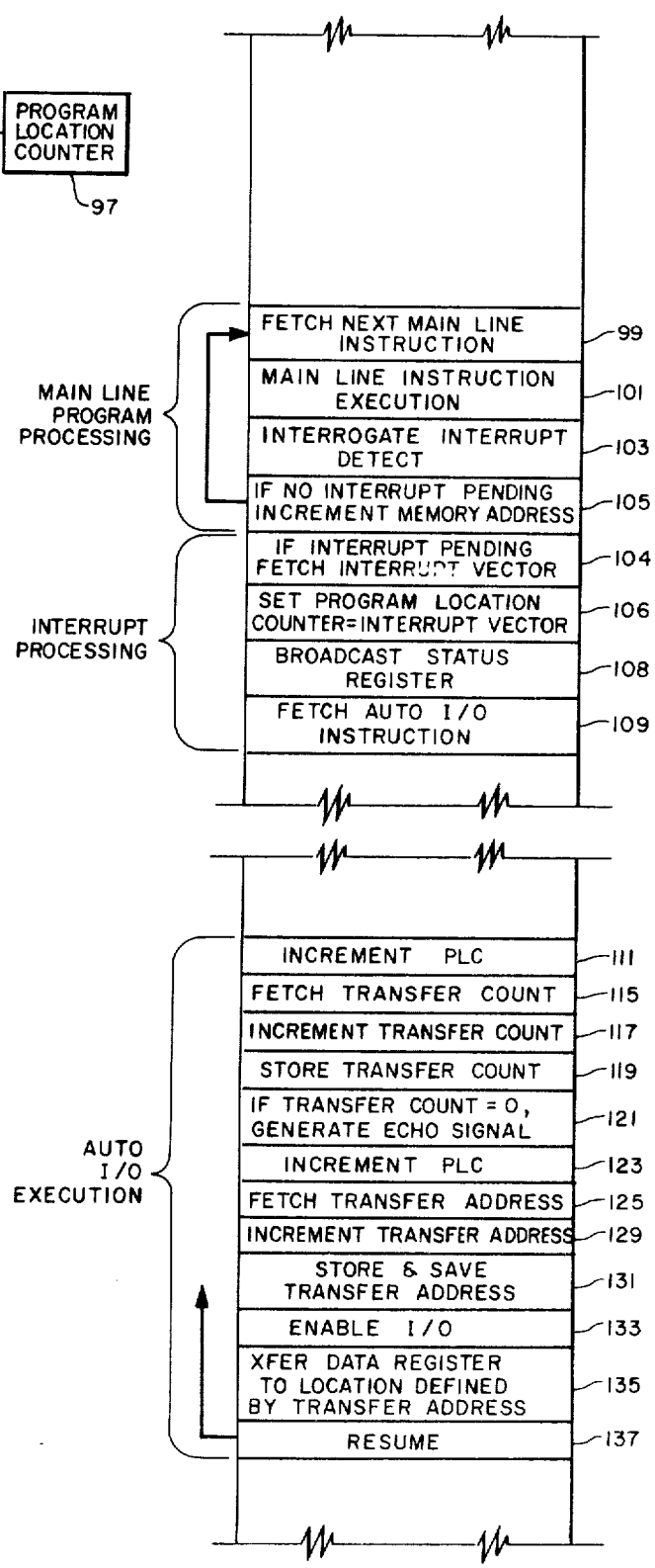

REMOTE DISTRIBUTED INTERRUPT CONTROL FOR COMPUTER PERIPHERALS

This is a continuation of application Ser. No. 866,159 filed Dec. 30, 1977.

BACKGROUND OF THE INVENTION

This invention relates to communication links between central processing units in computing networks and peripheral devices used for inputting and outputting data to and from the central processing unit. More particularly, this invention relates to a method of controlling interrupt signals generated by plural peripheral devices in order to permit the central processing unit to preselect interrupt signals by interrupt classification.

The prior art development of communication networks linking central processing units with plural input and output peripheral devices has developed along two primary paths. In the first of these paths, a central processing unit develops a time sharing system by polling plural remote peripheral devices in a selected sequence, giving each of the peripheral devices an opportunity, in turn, to communicate with the central processing unit. In most such systems, a polling signal is generated at the central processing unit, as by addressing each of the peripherals in turn, so that the data transmission from the peripherals can be synchronized. Such polling systems are inherently inefficient since they require that the central processing unit address peripherals in turn, regardless of whether those peripherals have data to transmit to the central processing unit. Thus, each time that a polling signal is transmitted to a peripheral device which does not require servicing, a wasted communication step is incurred.

In order to overcome this inefficiency, the prior art has developed a peripheral communication scheme based upon interrupts. In such systems the peripheral devices are each associated with a controller which provides an interrupt user request signal to the central processing unit when data is to be supplied to or from the peripheral device. Typically, in response to this interrupt user request, the central processing unit, when time is available for processing the peripheral data, will issue an interrupt address request signal to the controller associated with the requesting peripheral device. In response to this address request, the peripheral controller will typically provide a vector signal on a data bus. This vector signal provides an address for the central processing unit which identifies a location in the memory of the central processing unit. This memory location typically stores the necessary operation codes required for servicing the interrupt signal. The central processing unit, in response to these operation codes, will direct the peripheral device, through its controller, to transmit data on the data bus.

With systems of this latter type, which are based upon peripheral interrupts for servicing peripheral devices, the central processing unit will often include priority logic which will permit the central processing unit to service simultaneously received interrupts in a priority order predetermined on the basis of the class of peripheral devices involved. Such schemes, however, do not permit the preselection of interrupt signals by the central processing unit, so that even those peripheral devices which are not to be serviced by the central processing unit will always, in prior art systems, issue interrupt signals which must be processed and then ignored by the central processing unit. This transmission of interrupt signals without preselection by the central processing unit causes inherent inefficiencies in the system.

SUMMARY OF THE INVENTION

The present invention solves these and other problems associated with the prior art through a preselection of interrupts by type. Only certain preselected classes of interrupts are permitted to be communicated to the central processing unit. This preselection is accomplished through a remote distributed interrupt control system which includes a broadcast communication line associated with each of the controllers connected to the plural peripheral devices. By broadcasting signals on these broadcast lines, the central processing unit can preselect interrupts, by interrupt class, which can be transmitted from the plural controllers to the central processing unit. This permits the central processing unit, for example, to allow the transmission of data interrupts while inhibiting the transmission of block interrupts. Alternatively, block interrupts could be permitted while data interrupts are inhibited. By such a preselection, the central processing unit can impose a control on the peripheral devices which increases the overall efficiency of the communication system.

These and other advantages of the present invention are best understood through the following detailed description which references the drawings, in which:

FIG. 3 is a schematic illustration of a series of instructions in the memory of FIG. 1; and FIG. 4 is a schematic illustration of a series of instructions in the control store of the control unit of FIG. 1 for implementing the present invention.

DETAILED DESCRIPTION OF THE PREFERRED EMBODIMENT

In order to present a thorough description of the preferred embodiment, it is helpful to first describe the fundamental operation of a microprogram computer and the manner in which such a computer operates in conjunction with an input/output logic unit and a data bus in order to communicate with plural peripheral devices.

It will be understood that, in many applications, the computer will be expected to service a substantial number of peripheral devices. These devices may be used, for example, to input data, as from card reading and teletype devices or to output data, as to printers, graphic display devices, such as CRTs and plotters. Other inputting equipment might include digitizers or process control monitors. In all instances, however, it is necessary for the computer to communicate with the input/output devices and regulate their operation so that the computer can communicate with them in sequence and, preferably, on a priority basis. Thus, for example, in a situation where plural peripheral devices request simultaneous communication with the central processing unit, the central processing unit will dictate a priority order for that communication.

While the prior art has developed polling systems in which the central processing unit systematically produces a series of polling pulses to give each of the peripheral units an opportunity in sequence to communicate with the central processing unit, it has been found, in general, that such systems are not time efficient. Thus, systems of this type require a series of polling signals to be transmitted to sequentially poll peripheral units, none of which may require service at a particular time. These unnecessary polling operations lower the overall time efficiency of the computer.

A better system, which has been developed by the prior art, is based upon interrupt requests which are generated at peripherals requiring service and transmitted through a bus to the central processing unit. The central processing unit, in systems of this type, stores the request for service and, when time is available, instructs peripheral devices, often on a priority basis, to communicate with the central processing unit. In systems of this type, therefore, communication only occurs when a peripheral requires servicing, and yet the central processing unit is still permitted to impose a priority order on the communication sequence.

Figure 1:
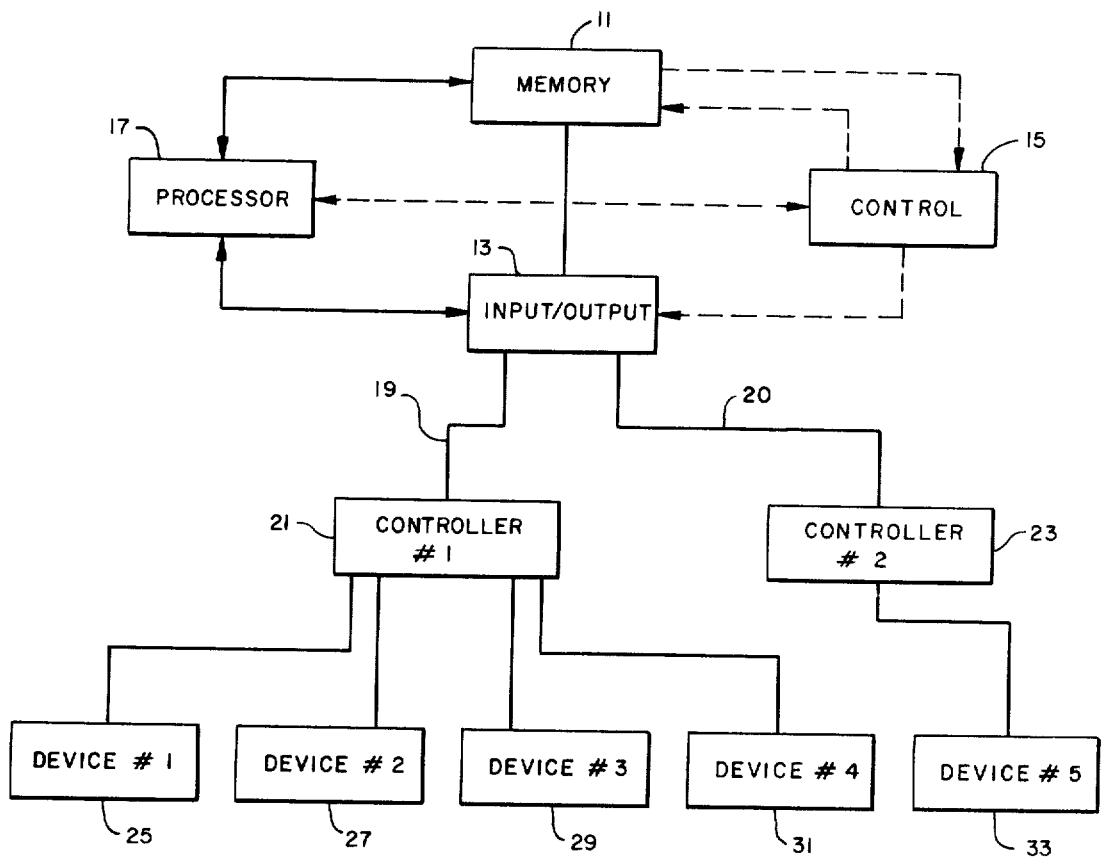
FIG. 1 is a schematic illustration of a central processing unit, together with plural peripheral devices and their controllers, which incorporate the present invention.

Referring initially to FIG. 1, the operation of a typical microprogram computer, particularly in relationship with its communication with peripheral devices, will be described. FIG. 1 is an overall block diagram of a typical data processor, whether "hard wired" or microprogrammed. Such processing systems typically include a main memory 11 which is designed to store the machine language program which controls the step-by-step operation of the data processing system, as well as data which is stored and manipulated or otherwise processed by the data processing system. The memory 11 may also include a number of buffers or registers which may be accessed by the computer system when temporary storage is required.

The memory 11 is connected by data lines to an input/output interface 13 which permits the inputting of information into the memory 11 and permits the memory to read data to output devices for the output of results and for communication with the programmer. The solid line connecting the memory 11 to the input/output interface 13 identifies these data lines. As will be understood through the more detailed description which follows, the input/output interface 13 includes logic which is used for communication with peripheral devices by the central processing unit. All data transfer between the memory 11 and the input/output interface 13 is controlled by control signals shown by dashed lines between a control unit 15, the memory 11 and the input/output interface 13.

The control unit 15, in addition to controlling the communication link between the memory 11 and input/output interface 13, supplies control signals to a processor 17, as shown by the dashed control line, so that the processor may operate on data from the memory 11 and from the input/output interface 13, as shown by solid lines. The solid line between the memory 11 and the control unit 15 identifies an instruction line, that is, the machine language program instructions which are stored in the memory 11 and which are accessed by the control unit 15 to determine the proper sequencing of events within the data processing system.

It can be seen from the diagram of FIG. 1 that the control unit 15 is the central sequencer for the entire data processing system and determines the sequence of events which will occur for all operations within the computer. This control unit 15 selects data sources and data paths to a desired processing unit and selects the desired modes of processing. In addition, the control unit will produce time pulses for control of the logic systems within the computer in order to properly sequence the events which occur.

The input/output interface 13 communicates through a plurality of buses 19,21 with a plurality of controllers 21,23 for the control of and communication with peripheral devices. The buses 19 and 20 typically include addressing lines and data lines which interconnect each of the controllers 21,23 with the input/output interface 13.

As shown in FIG. 1, any one of the plural controllers, such as the controller 21, may be connected to control a plurality of peripheral devices, such as the devices 25 through 31. Altnernatively, a controller, such as the controller 23, may be dedicated to a single peripheral device, such as the device 33. This will depend upon the particular peripheral devices requiring servicing and the type of controllers and physical location of these devices in the system.

It will be understood by those familiar with this art that the input/output interface 13 may communicate with a large plurality of controllers, the controllers 21 and 23 being exemplary only. In addition, it will be appreciated that each of these controllers may control and communicate with a large plurality of peripheral devices so that the central processing unit of FIG. 1 may, in some instances, control a great number of peripheral devices.

Those skilled in the art will also recognize that the peripheral devices 25–33 shown in FIG. 1 may be a wide variety of equipment, including card readers, memory systems, printers, graphic systems such as digitizers and plotters, and process sensors and control devices, the variety of which is well known in the art and is virtually limitless. The system of the present invention relates, particularly, to the interconnection buses 19 and 20 and the manner in which these buses are designed and used for controlling communications between the input/output interface 13 and the controllers 21 and 23.

Figure 2:
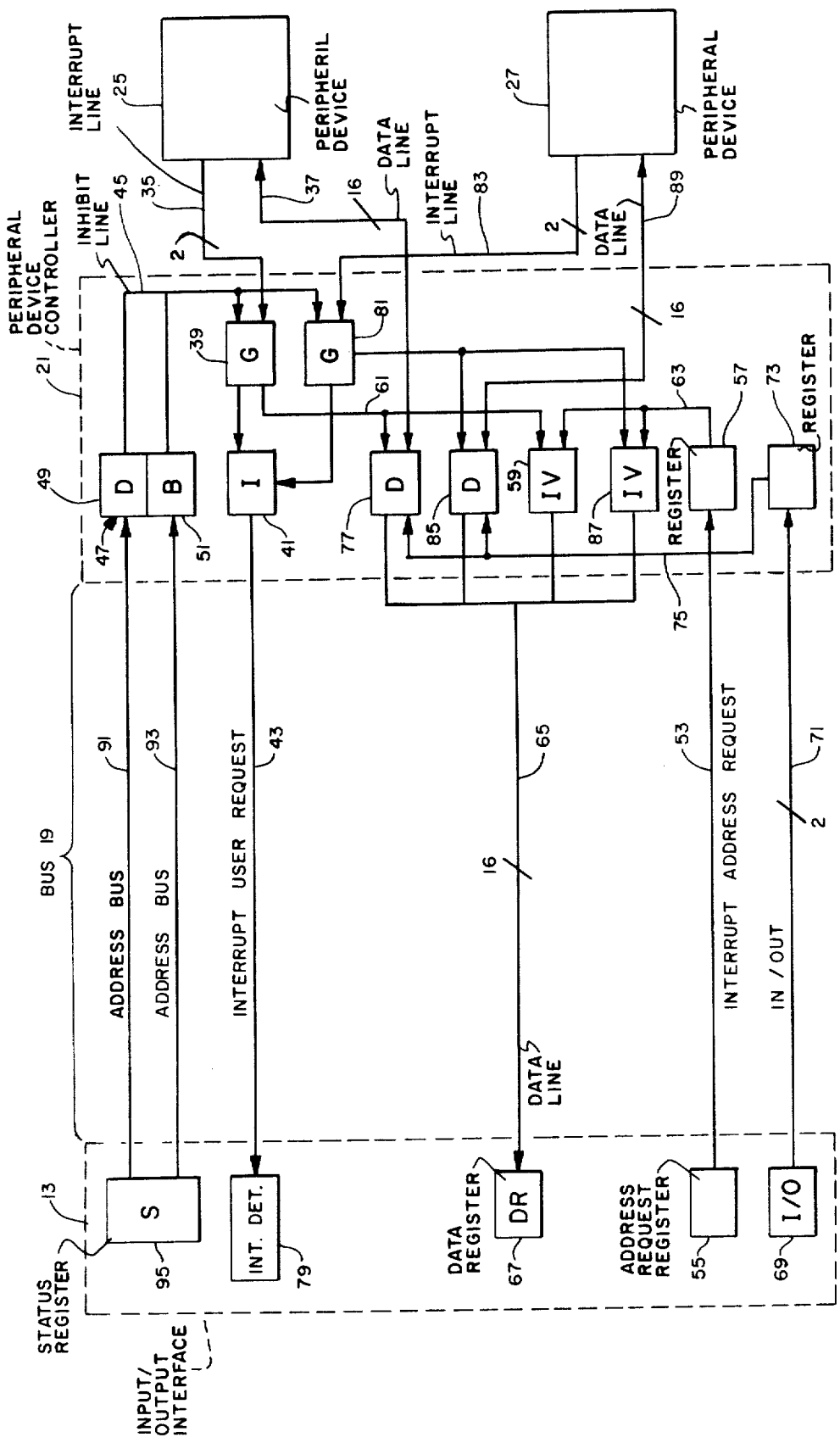
FIG. 2 is a schematic illustration of a portion of the input/output interface and a controller of FIG. 1, along with peripheral devices to show the interconnections between these units.

Referring now to FIG. 2, a more detailed schematic diagram of the portions of the input/output interface 13 which form a part of the present invention; the controller 21, taken as typical of the controllers 21 and 23 and the remaining plurality of controllers in the system; and the peripheral devices 25 and 27, taken as typical of the devices controlled by the controller 21, is shown. It will be understood by those skilled in the art that the bus 19 is, in many instances, common for all communication lines. Thus, referring briefly once again to FIG. 1, the bus 19 shown in FIG. 2 may be common with the bus 20 of FIG. 1. In addition, this common bus may be used for all of the data and control interfacing between the memory 11, input/output interface 13, control unit 15, and processor 17, which were described earlier. In the preferred embodiment of the present invention, this bus 19 of FIG. 2 includes 18 unidirectional address bus lines, 16 bidirectional data bus lines, and 15 unidirectional control bus lines interconnecting all of the elements of the data processing system, as well as the peripherals 25 through 33 of FIG. 1.

Referring now once again to FIG. 2, the peripheral device 25 is shown as connected to the controller 21 by a pair of buses, including a two-line control bus 35 and a 16-line data bus 37. When the peripheral device 25 requires communication with the central processing unit, it will generate an interrupt signal on the control bus 35. Using the two lines for the control bus 35, this interrupt signal from the peripheral device 25, may be any one of four different classes of interrupts. Thus, for example, if the peripheral device 25 is a data card reader, a first interrupt type may be an indication that the card reader has read a column of data and that this column of data is ready for transmission to the central processing unit. Alternatively, for example, the interrupt may be an end of card interrupt, indicating that the card reader has read all 80 columns of data from a single card. In accordance with the data which is to be sent, therefore, the peripheral device 25 sets logic elements 39 in the controller 21 marked G. This data is, in turn, supplied by the logic 39 to an interrupt register 41 marked I. The interrupt register 41 is connected directly to an interrupt user request line 43 of the bus 19, and generates a data bit indicating that a peripheral device connected to the controller 21 requires data servicing.

The G logic elements 39 are also connected by a line 45 to a 2-bit inhibit register 47. The register 47 is shown as including a D bit 49 and a B bit 51. While this register 47 has four permissible binary states in the preferred embodiment, only two of these states are utilized, one the D bit controlling data interrupt inhibit and the B bit controlling the block interrupt inhibit. These states are used to control "data" interrupts and "end of block" interrupts. In the example cited previously, a "data" interrupt would be an interrupt generated by a card reader when it has a column of data for transmission. An "end of block" interrupt would be the interrupt used by that same card reader when it has finished reading a card. Virtually all peripheral devices have at least two such interrupt signals which may be conveniently classed as data interrupts and event interrupts. The bit 49 of register 47 controls data interrupts and the bit 51 controls event interrupts. When the data on line 35 indicates that a data interrupt should be transmitted, the logic elements 39 will permit the interrupt register 41 to transmit an interrupt user request signal on the line 43 only if the D bit 49 is not set. Similarly, the random logic G, 39, will permit a transmission of an interrupt signal from the register 41 in response to an event or end of block signal on the lines 35, only if the B bit 51 of register 47 is not set. If the D bit 49 is set, it will inhibit, through the random logic G, 39, an interrupt user request signal from being sent from the register 41 in response to a data signal on the lines 35, such as a column signal from a card reader. Similarly, if the B bit 51 is set, this condition will inhibit the transmission of an interrupt user request signal from the register 41 in response to an end of block or event interrupt indicated by the data on line 35 from the peripheral device 25.

The central processing unit, through its input/output interface 13, will respond to interrupt user request signals on line 43 (in a manner which will be described in more detail below) by transmitting to the control unit 21 an interrupt address request on line 53 this request will typically originate at a register 55 within the input/output interface 13. This interrupt address request 53 is used to set a register 57 in the controller 21 which enables transmission of an interrupt vector signal from an interrupt vector register 59 associated with the peripheral device 25. The interrupt vector register 59 is connected by line 61 to the G logic 39 in the controller 21, this connection 61 also performing an enabling function for register 59.

Thus, the data on line 61 will indicate that it is the peripheral device 25 which requires servicing, and the signal on a line 63 will indicate that an interrupt user request has been received from the central processing unit. The interrupt vector register 59 will then be enabled to couple onto the 16-bit data line 65 of the bus 19, a 16-bit interrupt vector which serves as an address for the central processing unit to permit transmission of data from the peripheral device 25 to the central processing unit in a manner which will be described in more detail below.

The interrupt vector from the data bus 65 is stored in a data register 67 in the input/output interface 13 for use by the central processing unit. Once this vector is received, under control of the central processing unit as will be described below, a register 69 in the input/output interface 13 transmits an input/output command signal on a 2-line control bus 71 to a register 73 in the controller 21. This register 73 is connected, as shown by the line 75, to a data register 77 as an enable signal. The data register 77 is connected to the 16-bit data line 37 from the peripheral device 25 and has stored, at the time that the initial interrupt user request signal was transmitted on line 43, the data from the peripheral device 25. This data is now transmitted on the data line 65 from the register 77 in response to the signal from the register 73, and is stored in the data register 67 of the input/output interface 13 for use by the central processing unit.

To summarize the processes which have been described in reference to FIG. 2, the peripheral device 25 reads a column of data, for example, if it is a card reader, or the end of a card, and places 16 bits of data in the data register 77. This data remains in the register 77 until it is enabled for transmission by a signal on the line 75. Immediately, however, the interrupt register 41, under control of the random logic G, 39, and the inhibit register 47, will transmit an interrupt user request on the line 43 if bit D, 49, is not set (in the case of a data transmission) or the bit B, 51, is not set (in the case of an event or end of block interrupt). The interrupt user request signal 43 will be received by interrupt detection logic 79 in the input/output interface 13, causing the central processing unit, through the input/output interface 13, to transmit an interrupt address request on line 53. This request will be supplied to a register 57 which will enable the interrupt vector register 59, which has typically stored within it the interrupt vector of the peripheral device 25, so that this register 59 can transmit on the data bus 65 to the data register 67 of the input/output interface 13 an address which is specifically related to the peripheral device 25 for controlling the reading of data from this device 25. In response to the interrupt vector, an input/output signal will be transmitted from the register 69 of the input/output interface 13 over bus 71 to register 73 for providing a signal on line 75 to enable the data register 77 to transmit or receive its data on the bus 65 for use at the central processor or the peripheral device.

It will be understood, of course, that the controller 21 will often be connected to multiple peripheral devices, such as the devices 25 and 27 of FIG. 2. In this instance, a second set of G logic 81 will interface with a separate control line pair 83 from the peripheral device 27; and separate data and interrupt vector registers 85 and 87, respectively are enabled by this second G logic 81. The second data register 85 is coupled to the peripheral device 27 by a second 16-line data bus 89. Thus, for each additional peripheral device to the controlled by the controller 21, an additional set of G logic, an additional D register, and an additional IV register must be included, but no duplication of the inhibit register 47, the interrupt register 41, or the register 57 is required.

The bus 19 includes a pair of lines 91 and 93 which communicate with the inhibit register 47 for setting the bits 49 and 51 in response to a status register 95 in the input/output interface 13. When the data in the status register 95 is broadcast, signals will be transmitted on the lines 91 and 93, in a manner more fully described below, to set the bits D and B in registers 49 and 51 to selectively inhibit the transmission of interrupt user request signals on line 43, depending on the type or class of interrupt signal generated on lines 35 and 83.

It will be readily understood by those skilled in the art that the entire system shown in FIGS. 1 and 2, with the exception of the status register 95, the bus 91,93, and inhibit register 47, is well known in the prior art. Thus, the present invention adds to the state of the art peripheral communication systems the ability to selectively inhibit interrupt user request signals on the basis of interrupt type or classification.

Thus, in the example given above, data interrupts, such as column interrupts from a card reader, can be inhibited without inhibiting block interrupts from the same card reader. Alternatively, block interrupts or event interrupts can be selectively inhibited without inhibiting data interrupts. It is important to recognize that the lines 91 and 93 set an inhibit register 47 in all controllers 21 connected to the central processor unit in an identical manner so that the same inhibit instructions are broadcast to all peripheral device controllers. Thus, the central concept of the present invention is the selective inhibition of interrupt user request signals on the basis of interrupt classes rather than on the more typical basis of peripheral device type or location. The added programming flexibility in the device of the present invention permits a programmer to selectively inhibit interrupts based upon interrupt classification in order to prevent unnecessary interruption of the central processing unit while assuring that data necessary for normal processing is communicated to the central processing unit.

It will also be recognized by those familiar with this art that the G logic units 39 and 81 of FIG. 2 will prioritize between the multiple peripheral units such as the units 25 and 27 so that, if both of these units require data transmission or access simultaneously, the servicing of one will be delayed so that the servicing of the higher priority unit may first be accomplished.

Referring now to FIGS. 3 and 4, the operation of the memory 11 and control 15 as they interface with the input/output interface 13 for handling interrupts will be described. FIG. 3 is a schematic representation of a small part of the data within the memory 11. FIG. 4 is a schematic representation of a small part of the control store within the control 15. It will be understood by those skilled in the art that the control 15 includes execute logic, execute registers, and other hardware in addition to the control store, which is not shown in FIG. 4.

During normal operation of the computer, a program location counter 97 is periodically updated to form an addressing register for the memory 11. The control store, during mainline program processing, as shown at instruction 99, will fetch the instruction at the location addressed by the program location counter 97 and, an instruction 101, will execute that instruction. At the end of executing each mainline program instruction, the control store, at instruction 103, will interrogate the interrupt detector 79 (FIG. 2). If an interrupt user request has been received at line 43 during the execution of the last mainline program instruction, the interrupt detector register 79 will be set and, in response to the interrogation at instruction 103, the control store will process the interrupt beginning at instruction 104. If, on the other hand, the interrupt detect register 79 has not been set, instruction 105 of the control store will return the control store counter to instruction 99 to being the execution of the next mainline program instruction.

At step 104 the interrupt vector is fetched by enabling the register 55 (FIG. 2) to generate an interrupt address request on line 53 to the controller 21 (FIG. 2). As previously explained, this fetching operation of instruction 104 (FIG. 4) will result in an interrupt vector being transmitted from the controller 21 to the data register 67 (FIG. 2). At step 106, the program location counter 97 is made equal to the interrupt vector in the data register 67, which places the program location counter 97 at location 107, the location required for servicing the particular peripheral device which generated the interrupt.

At step 108 the data in the status register 95 (FIG. 2) is broadcast on the buses 91 and 93 to update the B and D registers 51,49 of the inhibit register 47 of all controllers 21. The status register 95 may be updated at any time by mainline programming or, automatically, in response to other program executions by the control store of FIG. 4. However, regardless of the time when the status register 95 is updated, its updated data will only be broadcast on the buses 91 and 93 (FIG. 2) only during servicing of an interrupt, as at step 108, or in response to a specific broadcast instruction in the mainline program. Thus, it is possible to update the status register 95 and to generate one last interrupt prior to updating of the inhibit register 47 to inhibit the class of interrupts which are being accessed.

Once the status register has been broadcast, instruction 109 fetches the execution instruction for this interrupt from the main memory 11. In an exemplary situation, this may be an automatic input/output instruction in main memory shown at 107 of FIG. 3. This instruction includes the transfer count and the data address, that is, the address of the particular peripheral device which has generated the interrupt vector; and a function code. This function code determines whether the operation is going to be a column input, or a status input from the device.

In response to the automatic I/O instruction, an execution process is initiated at instruction 111 of FIG. 4 by incrementing the program location counter 97. Once the program location counter 97 has been incremented, the transfer count located at location 113 of FIG. 3 is fetched at step 115, incremented at step 117 and restored at step 119 in location 113 of FIG. 3. If, after incrementing, the transfer count is equal to zero, instruction 121 will generate an "echo" signal, which will be described in more detail below. Otherwise, the instruction 123 will again increment the program location counter 97 and instruction 125 will fetch the transfer address from location 127 of FIG. 3. This transfer address is incremented at step 129 and the incremented address is stored back in the location 127 by instruction 131. Instruction 131 also saves the incremented transfer address in a register. Step 133 next enables the I/O by enabling register 69 of FIG. 2 so that an input/output instruction is generated on bus 71 to enable the registers 77 and 85, as explained previously, to provide data from the peripheral unit to the data register 67. This data is transferred from the data register to the lcoation defined by the transfer address at location 127 (FIG. 3) by instruction 135. Instruction 137 then returns the program control to instruction 99 where the next mainline instruction is fetched.

From the preceding description, it can be seen that each time an interrupt is serviced, the contents of the status register 95 of FIG. 2 will be broadcast on the buses 91 and 93 to all of the controllers 21 in the system so that interrupts may be inhibited on the basis of interrupt classifications.

If, at instruction 121, an echo signal is generated, the controller 21 will be instructed to generate a new interrupt process (end of block or event) so that a new vector will be generated. The fact that the transfer count has reached zero, as is indicated at instruction 121, indicates that, for example, an entire card of data has been read, if the peripheral device is a card reader; or an entire line of data has been input from a teletype. At this point the new vector generated (end of block) from the controller 21 in response to the echo signal will point to a new instruction 139, where a new instruction will provide an address for a microprogram to start executing a new sequence of steps to process the new interrupt.

Referring once again to FIG. 3, when the instruction 137 of the control store of FIG. 4 defines an end to the auto I/O execution, the program location counter 97 is vectored to the terminate instruction 139 which is used to terminate the auto I/O execution and to return the program location counter 97 to mainline program execution.

By permitting preselection of peripheral interrupts by interrupt class, the present invention increases the efficiency of peripheral communications without limiting the flexibility of the computing system or its ability to adequately communicate with each of the peripheral devices.

What is claimed is:
1. A computer system, comprising:
    (A) a central processing unit for controlling the step-by-step functioning of said computer system, receiving input signals and generating output signals;
    (B) an input/output interface connected to the input and output signals of said central processing unit, said interface comprising:
        means responsive to said output signals of said central processing unit for generating at least a first and second dissimilar inhibit signal, and for transmitting said inhibit signals;
    (C) a remote peripheral device, said peripheral device generating and transmitting a first and second class of interrupt signals for a respective first and second class of data requiring transmission to said central processing unit;
    (D) a peripheral device controller connected to said remote peripheral device, said peripheral device controller also connected to said central processing unit through said input/output interface, and comprising:
        (1) means for transmitting said first or second class of data requiring transmission to said central processing unit in response to receipt of either said first class or said second class of interrupt signal transmitted by said peripheral device, respectively;
        (2) means responsive to either said first or second inhibit signal for selectively inhibiting said transmitting means from operating in response to receipt of either said first or second classes of interrupt signal, respectively, and
        (3) said inhibiting means receptively communicating with said means for generating and transmitting first and second dissimilar inhibit signals.
2. A computer system, as defined in claim 1, wherein said central processing unit comprises:
    means decoding instructions for controlling the operation of said inhibit signal generating means in response to said instructions.
3. A computer system, as defined in claim 1, wherein said first class of interrupt signals comprises data interrupts and said second class of interrupt signals comprises event interrupts.
4. A computer system, as defined in claim 1, additionally comprising:
    a second peripheral device controller connected to a remote peripheral device, said second peripheral device controller connected to said central processing unit through said input/output interface, wherein both said peripheral device controller and said second peripheral device controller receive identical said frist and second inhibit signals.
5. A computer system, as defined in claim 1, additionally comprising:
    a second peripheral device; and
    wherein said peripheral device controller is connected to both said peripheral device and said second peripheral device, said second peripheral device being dissimilar from said peripheral device.
6. A computer system, as defined in claim 1, wherein said inhibit signal generating means transmits said inhibit signals to said peripheral device controller in response to program instructions in said central processing unit.
7. A computer communication system, comprising:
    (A) a central processing unit;
    (B) an input/output bus connected to said processing unit;
    (C) a remote peripheral device generating first and second classes of interrupt signals for respective first and second classes of data requiring transmission to said central processing unit;
    (D) a peripheral device controller connected to said input/output bus and to said remote peripheral device, said peripheral device controller including means for communicating with said central processing unit by first transmitting an interrupt user request signal to said processing unit, in response to receipt of either said first or second class of interrupt signal and later transmitting either said first or second class of data, respectively, after said central processing unit has ordered the transmission in response to said interrupt user request signal; and
    (E) means in said central processing unit for generating and transmitting an inhibiting signal on said input/output bus to said communicating means in said peripheral device controller; and
    (F) inhibiting means in said communicating means in said peripheral device controller for selectively inhibiting the transmission of said interrupt user request signal for one or the other of said first and second classes of interrupt signals from said peripheral device after receipt of and in response to said inhibiting signal.

8. A computer communication system, as defined in claim 7, wherein said first and second class of interrupt signals comprise data interrupt signals and event interrupt signals, respectively.

9. A computer communication system, as defined in claim 7, additionally comprising:
a second peripheral device;
wherein said peripheral device controller is connected to both said peripheral device and said second peripheral device, said second peripheral device being dissimilar from said peripheral device; and
a second peripheral device controller, wherein said peripheral device controller and said second peripheral device controller each receive identical inhibiting signals from said central processing unit.

10. A computer communication system, as defined in claim 7, wherein said means for transmitting a selectively inhibiting signal comprises a register whose data is broadcast whenever said central processing unit receives an interrupt user request signal from said peripheral device controller.

11. A computer communication system, as defined in claim 7, wherein said means for transmitting a selectively inhibiting signal comprises a register whose contents are broadcast to said peripheral device controller, said register being programmable by said central processing unit.

12. A computer system, comprising:
(A) a central processing unit, comprising:
(1) a memory; and
(2) an input/output interface which includes an interrupt detector, an interrupt status register, an input/output register and an interrupt address request register;
(B) an input/output bus connected to said input/interface;
(C) a remote peripheral device generating two different classes of interrupt signals for respective classes of data requiring transmission to said central processing unit;
(D) a peripheral device controller, connected to said remote peripheral device, said peripheral device controller also connected to said input/output bus, and comprising:
(1) means responsive to said two different classes of interrupt signals for transmitting an interrupt user request signal on said input/output bus to said interrupt detector;
(2) means responsive to said interrupt address request register for transmitting an interrupt vector on said input/output bus for designating the location of instructions in said memory for controlling the inputing of data from said peripheral device to said central processing unit;
(3) means responsive to said input/output register for transmitting data to said interface; and
(4) inhibiting means receptively communicating on said input/output bus with said status register and communicating commands to said interrupt user request signal transmitting means for inhibiting operating of said interrupt user request signal transmitting means from transmitting signals in response to a particular one of said two different classes of interrupts.

13. A computer system, as defined in claim 12, wherein said central processing unit additionally comprises:
means for broadcasting the contents of said status register to said peripheral device controller periodically.

14. A computer system, as defined in claim 13, wherein said broadcasting means operates whenever an interrupt signal is transmitted to said interrupt detector.

15. A computer system, as defined in claim 12, wherein the contents of said interrupt status register are programmable.

16. A computer system, as defined in claim 12, additionally comprising:
a second peripheral device; and
wherein said peripheral device controller is connected to both said peripheral device and said second peripheral device, said second peripheral device being dissimilar from said peripheral device.

17. A computer communication system, comprising:
(A) a central processing unit, comprising:
an input/output interface connected to communicate with said central processing unit, said interface comprising:
means for generating at least a first and second dissimilar inhibit signal, and for transmitting said inhibit signals;
(B) means remote from said processing unit and said interface, connected to communicate with said interface, for generating and transmitting a first or second class of data signals, and for controlling the transmission of said first or second class of data signals to said interface, comprising:
(1) means for generating either a first or second class of interrupt signal for a respective one of said first or second class of data signals;
(2) means for transmitting said first or second class of data signals requiring transmission to said interface after generation of either said first class or said second class of interrupt signal, respectively;
(3) means responsive to either said first or second inhibit signals for selectively inhibiting said data signal transmitting means from operating in response to generation of either said first or second class of interrupt signal, respectively; and
(4) said inhibiting means connected to receptively communicate with said means for generating and transmitting dissimilar inhibit signals.

18. A computer communication method, comprising:
generating at a location remote from a central processing unit, a first and second class of data signals requiring transmission to an input/output interface at said central processing unit;
generating at said remote location, a first and second class of interrupt signal, respectively, for said first and second class of data signals requiring transmission;
generating at said remote location a user request signal in response to either said first or second class of interrupt signal, and transmitting said user request signal to said interface;
generating, at said interface, in response to said user request signal, an interrupt address request signal, and transmitting said address request signal to said remote location;
generating, at said remote location, in response to said address request signal, and transmitting to said interface, an interrupt vector for designating the location of instructions in a memory of said central processing unit for controlling the inputing of data to said central processing unit;

generating, at said interface, in response to said interrupt vector, an input/output signal, and transmitting said input/output signal to said remote location;

transmitting said first or second class of data, from said remote location to said interface, in response to said input/output signal;

selectively generating, at said interface, and transmitting to said remote location, a first and second class of inhibit signals;

selectively inhibiting, in response to receipt of said first or second inhibit signals at said remote location, said generation of a user request signal in response to either said first or second class of interrupt signal, respectively.

* * * * *